UNITED STATES PATENT OFFICE.

JOACHIM VON BRENNER, OF VIENNA, AUSTRIA-HUNGARY.

DISINFECTING COMPOSITION AND PROCESS OF MAKING SAME.

SPECIFICATION forming part of Letters Patent No. 625,319, dated May 23, 1899.

Application filed January 5, 1899. Serial No. 701,244. (No specimens.)

*To all whom it may concern:*

Be it known that I, JOACHIM VON BRENNER, a subject of the Emperor of Austria-Hungary, residing at Vienna, in the Province of Lower Austria, in the Empire of Austria-Hungary, have invented certain new and useful Improvements in a Disinfecting Composition and Process of its Manufacture; and I do hereby declare the following to be a full, clear, and exact description of the invention, such as will enable others skilled in the art to which it appertains to make and use the same.

This invention relates to the production, from the crude resin obtained from coniferous trees, of a composition which is suitable for use as a disinfectant, both as a body or base for cosmetics and smelling-stuffs and as a ground composition or paint for the surface of walls, partitions, and the like.

This process consists, essentially, in saponifying a mixture of the monohydrochlorid of terpene, ($C_{10}H_{16}HCl$,) hereinafter called "terpene hydrochlorid," and resin in the soft condition in which it is obtained direct from the trees, (hereinafter called "soft resin,") "sulfuring" the mass thus obtained by treating it at a suitable temperature with sulfur, and finally melting the sulfured product together with a water-soluble fat soap—for instance, with oleic soap.

In carrying out this process, first either terpene hydrochlorid, ($C_{10}H_{16}HCl$,) which has been produced in the usual manner by passing hydrochloric-acid gas into turpentine-oil that has been reduced to a low temperature, or the crystalline mass formed in such process, together with any remainder of hydrochlorated oil that has not been converted into the crystalline state, is introduced into a hot alkaline solution, (potash or soda-lye,) and after everything has dissolved there is added to the solution the soft resin or colophony in the proportion of five to fifty times the amount of terpene hydrochlorid employed.

During the saponifying process, which is carried on with frequent stirring and at boiling heat, sulfur, preferably in the form of flowers of sulfur, is introduced into the mass and is boiled up therein until completely dissolved. The mass, which has thus been sulfured and become homogeneous, is now allowed to cool completely and settle for the purpose of drawing off the lye which forms at the bottom during the saponifying and sulfuring operations and may be used again. The remaining cooled product is finally completely neutralized by treatment with a suitable dilute mineral acid, preferably hydrochloric acid, then melted, and into the melted product there is introduced an equal quantity of a suitable water-soluble fat soap, such as saponified oleic acid, and the mixture is stirred until a homogeneous mass has formed. If desired, asphalt or tar may also be added to the mass.

The resin preparation that is obtained as the final product of the herein-described process consists of a whitish-gray mass having a smell of camphor, which by reason of its antiseptic and cosmetic properties can be used as a disinfectant, particularly as a ground composition or paint for walls, partitions, and the like, and also as a body or base for cosmetics and smelling stuffs.

I claim—

1. The process, which consists in saponifying a mixture of terpene hydrochlorid ($C_{10}H_{16}HCl$) and resin, sulfurating and then neutralizing the saponified mass, and mixing with the product a fatty soap, for the purpose set forth.

2. The herein-described antiseptic substance consisting of a neutralized saponified mixture of resin and terpene hydrochlorid ($C_{10}H_{16}HCl$) sulfur and a fatty soap, for the purposes set forth.

In testimony that I claim the foregoing as my invention I have signed my name in presence of two subscribing witnesses.

JOACHIM VON BRENNER.

Witnesses:
 JOSEF RÜBASCH,
 ALVESTO S. HOGUE.